(12) United States Patent
Chen et al.

(10) Patent No.: US 12,227,204 B2
(45) Date of Patent: Feb. 18, 2025

(54) SYSTEMS AND METHODS FOR DETECTING ROADWAY LANE BOUNDARIES

(71) Applicant: Toyota Research Institute, Inc., Los Altos, CA (US)

(72) Inventors: Kun-Hsin Chen, Mountain View, CA (US); Shunsho Kaku, Mountain View, CA (US); Jeffrey M. Walls, Ann Arbor, MI (US); Jie Li, Los Altos, CA (US); Steven A. Parkison, Ann Arbor, MI (US)

(73) Assignees: Toyota Research Institute, Inc., Los Altos, CA (US); Toyota Jidosha Kabushiki Kaisha, Toyota (JP)

( * ) Notice: Subject to any disclaimer, the term of this patent is extended or adjusted under 35 U.S.C. 154(b) by 265 days.

(21) Appl. No.: 17/895,330

(22) Filed: Aug. 25, 2022

(65) Prior Publication Data

US 2024/0067207 A1 Feb. 29, 2024

(51) Int. Cl.
*B60W 60/00* (2020.01)
*B60W 10/18* (2012.01)
(Continued)

(52) U.S. Cl.
CPC .......... *B60W 60/001* (2020.02); *B60W 10/18* (2013.01); *B60W 10/20* (2013.01);
(Continued)

(58) Field of Classification Search
CPC .... B60W 60/001; B60W 10/18; B60W 10/20; B60W 2420/403; B60W 2552/53;
(Continued)

(56) References Cited

U.S. PATENT DOCUMENTS

2018/0373941 A1* 12/2018 Kwant ................. G08G 1/0145
2020/0026282 A1* 1/2020 Choe .................... G05D 1/0257
(Continued)

FOREIGN PATENT DOCUMENTS

CN 110827575 A 2/2020
EP 4152204 A1 * 3/2023 ........... G06F 18/241
(Continued)

OTHER PUBLICATIONS

WO-2020103892-A1.*
(Continued)

*Primary Examiner* — Hunter B Lonsberry
*Assistant Examiner* — Henry R Hinton
(74) *Attorney, Agent, or Firm* — Christopher G. Darrow; Darrow Mustafa PC

(57) ABSTRACT

Systems and methods for detecting roadway lane boundaries are disclosed herein. One embodiment receives image data of a portion of a roadway; receives historical vehicle trajectory data for the portion of the roadway; generates, from the historical vehicle trajectory data, a heatmap indicating, for a given pixel in the heatmap, an extent to which the given pixel coincides spatially with vehicle trajectories in the historical vehicle trajectory data; and projects the heatmap onto the image data to generate a composite image that is used in training a neural network to detect roadway lane boundaries, the projected heatmap acting as supervisory data. The trained neural network is deployed in a vehicle to generate and save map data including detected roadway lane boundaries for use by other vehicles or to control operation of the vehicle itself based, at least in part, on roadway lane boundaries detected by the trained neural network.

20 Claims, 5 Drawing Sheets

(51) Int. Cl.
 B60W 10/20 (2006.01)
 G01C 21/00 (2006.01)
(52) U.S. Cl.
 CPC ..... *G01C 21/3819* (2020.08); *G01C 21/3841* (2020.08); *B60W 2420/403* (2013.01); *B60W 2552/53* (2020.02); *B60W 2556/10* (2020.02); *B60W 2556/40* (2020.02); *B60W 2710/18* (2013.01); *B60W 2710/20* (2013.01); *B60W 2720/106* (2013.01)
(58) Field of Classification Search
 CPC ......... B60W 2556/10; B60W 2556/40; B60W 2710/18; B60W 2710/20; B60W 2720/106; G01C 21/3819; G01C 21/3841; G01C 21/3602; G01C 21/3822
 See application file for complete search history.

(56) References Cited

U.S. PATENT DOCUMENTS

| | | | | |
|---|---|---|---|---|
| 2021/0357670 | A1* | 11/2021 | Wu | G06V 20/56 |
| 2022/0270377 | A1* | 8/2022 | Shen | G06V 10/774 |
| 2022/0392235 | A1* | 12/2022 | Vig | G06V 20/588 |
| 2023/0074419 | A1* | 3/2023 | Alibeiginabi | G06V 20/588 |
| 2023/0290248 | A1* | 9/2023 | Swan | G08G 1/0141 |
| 2023/0298360 | A1* | 9/2023 | Yoo | G06V 20/588 382/103 |

FOREIGN PATENT DOCUMENTS

| | | | | |
|---|---|---|---|---|
| WO | WO-2020103892 | A1 * | 5/2020 | G06K 9/00798 |
| WO | 2021027568 | A1 | 2/2021 | |

OTHER PUBLICATIONS

Barnes, D. et al., "Find Your Own Way: Weakly-Supervised Segmentation of Path Proposals for Urban Autonomy," arXiv:1610.01238v3 [cs.RO], Nov. 17, 2017, Retrieved from https://arxiv.org/pdf/1610.01238.pdf. pp. 1-8 (8 pages).

Chen, D. et al., "Learning from All Vehicles," arXiv:2203.19934v2 [cs.RO], Apr. 13, 2022, Retrieved from https://arxiv.org/pdf/2203.11934, pp. 1-13 (13 pages).

Bautista, M. et al., "Learning Where to Drive by Watching Others," German Conference on Pattern Recognition, 2017, Retrieved from https://hci.iwr.uni-heidelberg.de/sites/default/files/publications/files/1510790970/main37.pdf, pp. 1-12 (12 pages).

Venator, M. Venator, "Visual Localization and Domain Adaptation for Road Scene Reconstruction from Car Fleet Images," Dissertation, Nov. 2021, found at https://opus4.kobv.de/opus4-fau/files/17711/DissertationMoritzVenator.pdf, pp. 1-198 (198 pages).

* cited by examiner

SYSTEMS AND METHODS FOR DETECTING ROADWAY LANE BOUNDARIES

TECHNICAL FIELD

The subject matter described herein generally relates to autonomous and semi-autonomous vehicles and, more particularly, to systems and methods for detecting roadway lane boundaries.

BACKGROUND

An important aspect of semi-autonomous and autonomous driving is detecting lane boundaries on the roadway to support tasks such as localization and navigation. Conventional lane-boundary detection systems employing machine-learning-based techniques may rely on high-definition (HD) map data and/or sensor data such as images or Light Detection and Ranging (LIDAR) point-cloud data. In some situations, HD map data might not be available, and under some weather conditions such as heavy rain or snow, detecting lane boundaries based on sensor data can be difficult or even impossible.

SUMMARY

An example of a system for detecting roadway lane boundaries is presented herein. The system comprises a processor and a memory storing machine-readable instructions that, when executed by the processor, cause the processor to receive image data of a portion of a roadway. The memory also stores machine-readable instructions that, when executed by the processor, cause the processor to receive historical vehicle trajectory data for the portion of the roadway. The memory also stores machine-readable instructions that, when executed by the processor, cause the processor to generate, from the historical vehicle trajectory data, a heatmap indicating, for a given pixel in the heatmap, an extent to which the given pixel coincides spatially with one or more vehicle trajectories in the historical vehicle trajectory data. The memory also stores machine-readable instructions that, when executed by the processor, cause the processor to project the heatmap onto the image data to generate a composite image and use the composite image in training a neural network to detect roadway lane boundaries, the projected heatmap acting as supervisory data. The trained neural network is deployed in a vehicle to perform one of (1) generating and saving map data that includes detected roadway lane boundaries, the map data being used to control, at least in part, operation of one or more other vehicles to which the map data is downloaded and (2) controlling operation of the vehicle based, at least in part, on one or more roadway lane boundaries detected by the trained neural network.

Another embodiment is a non-transitory computer-readable medium for detecting roadway lane boundaries and storing instructions that, when executed by a processor, cause the processor to receive image data of a portion of a roadway. The instructions also cause the processor to receive historical vehicle trajectory data for the portion of the roadway. The instructions also cause the processor to generate, from the historical vehicle trajectory data, a heatmap indicating, for a given pixel in the heatmap, an extent to which the given pixel coincides spatially with one or more vehicle trajectories in the historical vehicle trajectory data. The instructions also cause the processor to project the heatmap onto the image data to generate a composite image and use the composite image in training a neural network to detect roadway lane boundaries, the projected heatmap acting as supervisory data. The trained neural network is deployed in a vehicle to perform one of (1) generating and saving map data that includes detected roadway lane boundaries, the map data being used to control, at least in part, operation of one or more other vehicles to which the map data is downloaded and (2) controlling operation of the vehicle based, at least in part, on one or more roadway lane boundaries detected by the trained neural network.

In another embodiment, a method of detecting roadway lane boundaries is disclosed. The method comprises receiving image data of a portion of a roadway. The method also includes receiving historical vehicle trajectory data for the portion of the roadway. The method also includes generating, from the historical vehicle trajectory data, a heatmap indicating, for a given pixel in the heatmap, an extent to which the given pixel coincides spatially with one or more vehicle trajectories in the historical vehicle trajectory data. The method also includes projecting the heatmap onto the image data to generate a composite image and using the composite image in training a neural network to detect roadway lane boundaries, the projected heatmap acting as supervisory data. The trained neural network is deployed in a vehicle to perform one of (1) generating and saving map data that includes detected roadway lane boundaries, the map data being used to control, at least in part, operation of one or more other vehicles to which the map data is downloaded and (2) controlling operation of the vehicle based, at least in part, on one or more roadway lane boundaries detected by the trained neural network.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale. It is to be noted, however, that the appended drawings illustrate only possible implementations of this disclosure and are therefore not to be considered limiting of its scope. The disclosure may admit to other implementations.

To facilitate understanding, identical reference numerals have been used, wherever possible, to designate identical elements that are common to the figures. Additionally, elements of one or more embodiments may be advantageously adapted for utilization in other embodiments described herein.

DETAILED DESCRIPTION

Figure 1:
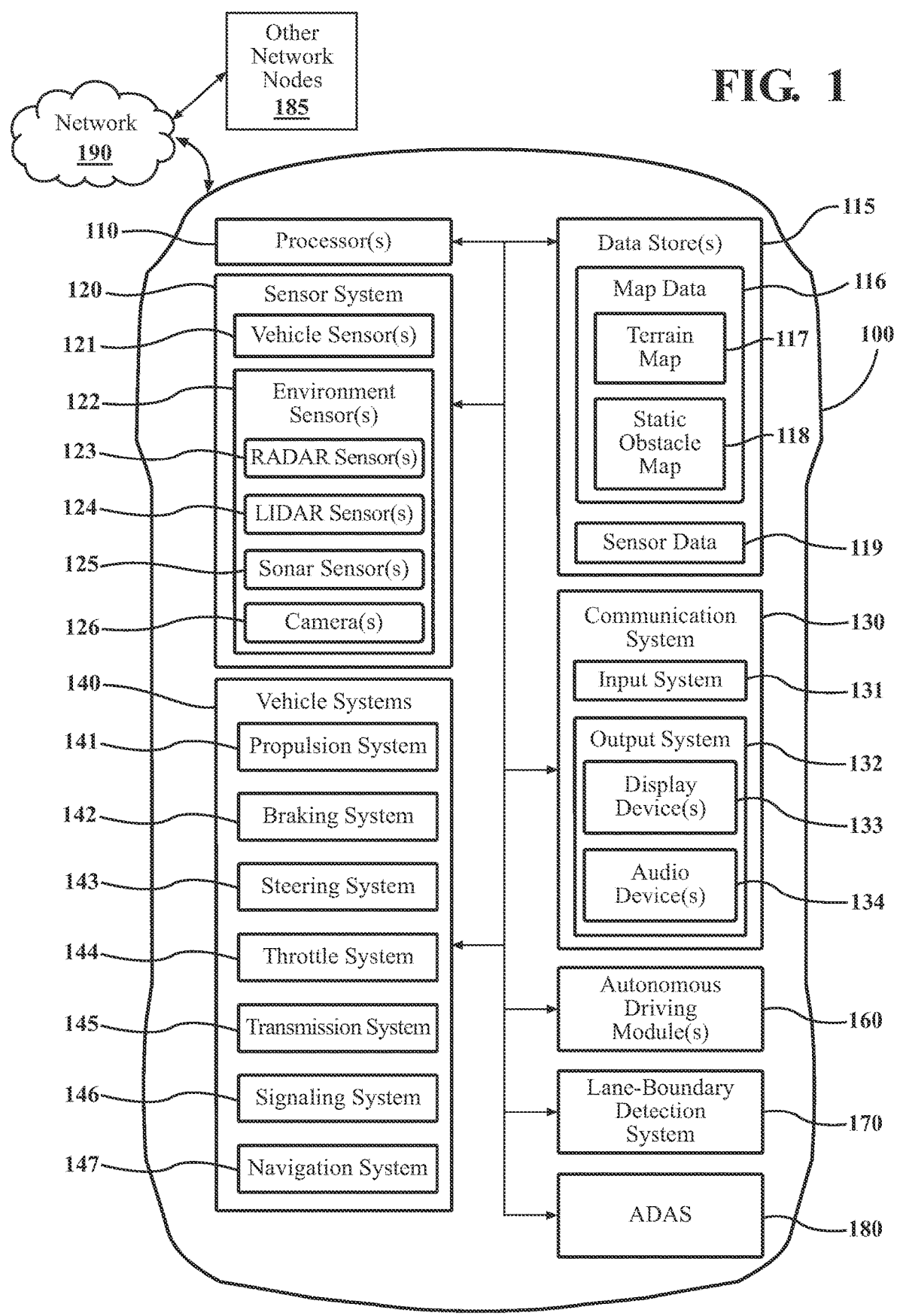
FIG. 1 illustrates one embodiment of a vehicle within which systems and methods disclosed herein may be implemented.

Various embodiments disclosed herein overcome the shortcomings of prior-art machine-learning-based roadway lane-boundary detection systems in at least two ways. First, during the training of a neural network to detect lane boundaries based on image input, historical vehicle trajectory data is used as weak supervision to improve the performance of the resulting trained network. Second, the trained network, when deployed in a semi-autonomous or autonomous vehicle (inference or test time), can continue to use historical vehicle trajectory data as an input to improve performance, particularly when HD map data is unavailable or when weather conditions (e.g., heavy rain or snow) interfere with the ability of the system to detect lane boundaries based on sensor (image) data.

In the various embodiments disclosed herein, a lane-boundary detection training system receives image data of a portion of a roadway. The system also receives historical vehicle trajectory data for the same portion of the roadway. The system generates, from the historical vehicle trajectory data, a heatmap indicating, for a given pixel in the heatmap, the extent to which that pixel coincides spatially with one or more vehicle trajectories in the historical vehicle trajectory data. This determination can be made for each pixel in the heatmap. The extent to which a given pixel coincides spatially with the historical vehicle trajectory data can be represented, for example, through colors. In one embodiment, pixels that spatially coincide with the historical vehicle trajectories to a large extent are represented in a bright color such as white, yellow, or red (representing the "hot" or "warm" regions of the heatmap), whereas pixels that spatially coincide with the historical vehicle trajectories to a small extent or not at all are represented in a dark color such as dark blue or black (representing the "cool" or "cold" regions of the heatmap).

Once the system has generated the heatmap, the system projects (superimposes) the heatmap onto the image data corresponding to the applicable portion of the roadway to generate a composite image. In a training phase conducted by the lane-boundary detection training system, the system uses the composite image in training a neural network to detect roadway lane boundaries. The projected heatmap acts as supervisory data (a weak supervisory signal) to improve the performance of the resulting trained neural network. The historical vehicle trajectory data is particularly useful for this purpose because the historical vehicle trajectories coincide closely with the centerline of the lane in question. Knowing where the centerline of the lane is assists the neural-network-based model in estimating where the left and right lane boundaries are, whether painted lines are clearly detectable on the roadway or not.

In an inference or test phase in which the trained neural network is deployed in a vehicle to detect lane boundaries, the same principles apply. Historical vehicle trajectory data can again be transformed to a heatmap and projected onto image data acquired from the vehicle's cameras, the resulting composite images being input to the trained neural network. The heatmap data is particularly helpful if high-definition (HD) map data is unavailable or if weather conditions (e.g., heavy rain or snow) interfere with the ability of the trained model to detect the lane boundaries based on image data. In such a situation, the in-vehicle system can still estimate the location of the lane boundaries based on the historical vehicle trajectory data represented as heatmaps.

Regarding inference or test mode, two different embodiments are described herein in which the trained neural network is deployed in a vehicle. In one embodiment, the trained neural network is used to generate and save map data of the environment that includes detected and semantically labeled roadway lane boundaries as the vehicle is driving around in the environment. In some embodiments, the saved map data (e.g., HD map data, in some embodiments) is downloaded to one or more other vehicles (in some embodiments, a large number of vehicles) to assist the other vehicles with semi-autonomous or autonomous driving tasks such as localization, motion planning, or navigation that involve detecting lane boundaries. Thus, the saved map data is ultimately used to control, at least in part, the operation of the other vehicles to which the map data has been downloaded. In a different embodiment, the trained neural network is used to control the operation of the ego vehicle in which it is deployed based, at least in part, on one or more roadway lane boundaries detected by the trained neural network. That is, the trained neural network is used to assist the vehicle in which it is deployed with tasks such as localization, motion planning, and navigation. Controlling the operation of a vehicle, in some embodiments, includes controlling at least one of acceleration, braking, and steering.

Referring to FIG. 1, an example of a vehicle 100, in which systems and methods disclosed herein can be implemented, is illustrated. As used herein, a "vehicle" is any form of motorized land transport, such as an automobile, that can operate in a semi-autonomous or autonomous driving mode. In some embodiments, vehicle 100 can operate, at least some of the time, in a highly autonomous mode (e.g., what the automotive industry refers to as autonomy Levels 3-5). In other embodiments, vehicle 100 can operate in a semi-autonomous mode (e.g., via an adaptive cruise-control system, an automatic lane-change assistance system, an automatic lane-keeping system, or an automatic parking system). In other embodiments, vehicle 100 includes an intelligent driving assistance system such as an Advanced Driver-Assistance System (ADAS) 180. The vehicle 100 can include a lane-boundary detection system 170 or capabilities to support or interact with the lane-boundary detection system 170 and thus benefits from the functionality discussed herein. Instances of vehicle 100, as used herein, are equally applicable to any device capable of incorporating the systems or methods described herein.

The vehicle 100 also includes various elements. It will be understood that, in various implementations, it may not be necessary for the vehicle 100 to have all the elements shown in FIG. 1. The vehicle 100 can have any combination of the various elements shown in FIG. 1. Further, the vehicle 100 can have additional elements to those shown in FIG. 1. In some arrangements, the vehicle 100 may be implemented without one or more of the elements shown in FIG. 1, including lane-boundary detection system 170. While the various elements are shown as being located within the vehicle 100 in FIG. 1, it will be understood that one or more of these elements can be located external to the vehicle 100. Further, the elements shown may be physically separated by large distances. As shown in FIG. 1, vehicle 100 can communicate with other network nodes 185 (e.g., other connected vehicles, cloud servers, edge servers, roadside units, infrastructure) via a network 190. In some embodiments, network 190 includes the Internet.

Some of the possible elements of the vehicle 100 are shown in FIG. 1 and will be described in connection with subsequent figures. However, a description of many of the elements in FIG. 1 will be provided after the discussion of FIGS. 2-5 for purposes of brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those skilled in the art, however, will understand that the embodiments described herein may be practiced using various combinations of these elements.

Sensor system 120 can include one or more vehicle sensors 121. Vehicle sensors 121 can include one or more positioning systems such as a dead-reckoning system or a global navigation satellite system (GNSS) such as a global positioning system (GPS). Vehicle sensors 121 can also include Controller-Area-Network (CAN) sensors that output, for example, speed and steering-angle data pertaining to vehicle 100. Sensor system 120 can also include one or more environment sensors 122. Environment sensors 122 generally include, without limitation, radar sensor(s) 123, Light Detection and Ranging (LIDAR) sensor(s) 124, sonar sensor(s) 125, and camera(s) 126. One or more of these various types of environment sensors 122 can be used to detect objects (e.g., external road agents such as other vehicles, bicyclists, motorcyclists, pedestrians, and animals) and, in other respects, understand the environment surrounding vehicle 100 and its associated traffic situations and conditions. This process is sometimes referred to as "traffic-situation understanding" or "scene understanding." In the context of the various embodiments described herein, camera(s) 126 are particularly important because the objective, in the inference or test phase, is to detect roadway lane boundaries based on image data using a trained neural-network-based model. In some embodiments, the roadway lane boundaries to be detected are painted on the roadway (e.g., painted white or yellow lines).

In embodiments in which vehicle 100 is capable of autonomous operation (e.g., Levels 3-5), vehicle 100 includes autonomous driving module(s) 160 to control various aspects of autonomous driving. In some embodiments, ADAS 180 operates in conjunction with autonomous driving module(s) 160 to provide semi-autonomous driving capabilities such as lane-keeping assistance and automatic collision avoidance.

A lane-boundary detection system 170 in a vehicle 100 is one example of the deployment of a trained neural network in a vehicle to detect roadway lane boundaries. Such embodiments are discussed in greater detail below in connection with FIGS. 3-4. First, however, the training phase mentioned above is discussed in connection with FIG. 2.

Figure 2:
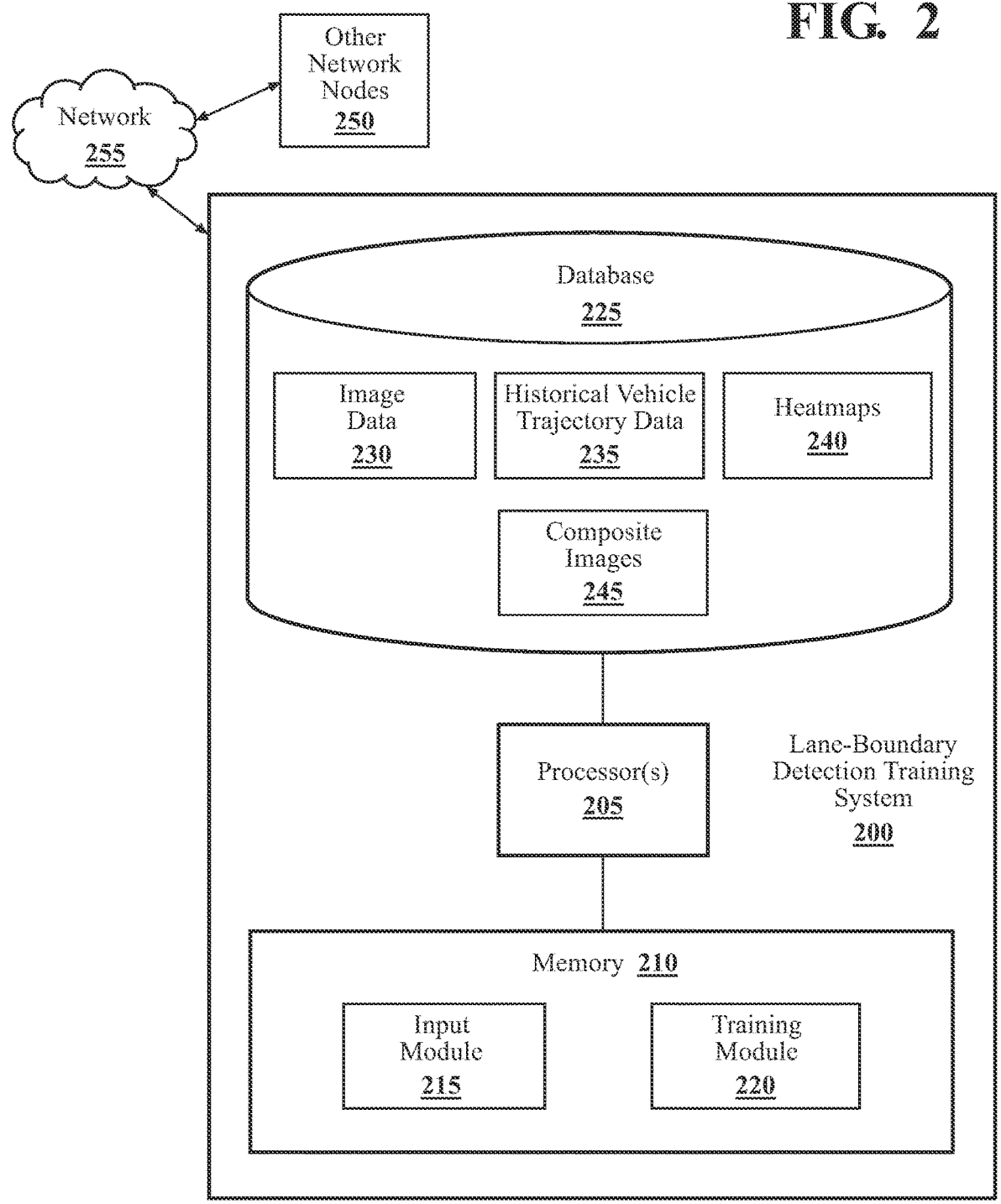
FIG. 2 is a block diagram of a lane-boundary detection training system, in accordance with an illustrative embodiment of the invention.

FIG. 2 is a block diagram of a lane-boundary detection training system 200, in accordance with an illustrative embodiment of the invention. In some embodiments, lane-boundary detection training system 200 is implemented in a server or workstation (e.g., at an automobile manufacturer's research and development facility). In this embodiment, lane-boundary detection training system 200 is shown as including one or more processors 205, and memory 210 stores an input module 215 and a training module 220. The memory 210 is a random-access memory (RAM), read-only memory (ROM), a hard-disk drive, a flash memory, or other suitable memory for storing the modules 215 and 220. The modules 215 and 220 are, for example, computer-readable instructions that, when executed by the one or more processors 205, cause the one or more processors 205 to perform the various functions disclosed herein.

Lane-boundary detection training system 200 can store various kinds of data in a database 225. Examples include image data 230, historical vehicle trajectory data 235, heatmaps 240 generated from the historical vehicle trajectory data 235, and composite images 245 (heatmaps 240 projected onto corresponding images in the image plane).

As shown in FIG. 2, lane-boundary detection training system 200 can communicate with one or more other network nodes 250 (e.g., other servers or workstations, client computers, mobile devices, etc.) via network 255. For example, lane-boundary detection training system 200 can communicate with other computing systems and local or remote databases to acquire image data 230 and historical vehicle trajectory data 235 for use in training a neural-network-based model to detect roadway lane boundaries.

Input module 215 generally includes machine-readable instructions that, when executed by the one or more processors 205, cause the one or more processors 205 to receive image data 230 of a portion of a roadway. That is, the image data 230 depicts, in pictorial form, the portion of the roadway in question. Input module 215 also includes instructions that, when executed by the one or more processors 205, cause the one or more processors 205 to receive historical vehicle trajectory data 235 for the same portion of the roadway just mentioned. In some embodiments, the image data 230 is collected from one or more vehicles in the field that gather images for use in training a neural-network-based lane-boundary detection system. In other embodiments, the image data 230 can be obtained from one or more public-domain or proprietary driving-related image databases. The historical vehicle trajectory data 235 can be obtained from one or more vehicles in the field that store such data as they drive around from place to place. Some current commercially available vehicles include the capability to store such trajectory data and to upload it to, e.g., a server or workstation such as that in which lane-boundary detection training system 200 is implemented.

As those skilled in the art are aware, historical vehicle trajectory data 235 can include granular vehicle-location data (e.g., latitude, longitude, and altitude) as a function of time in discrete time steps (e.g., 1-second intervals, in one embodiment). In some embodiments, altitude is ignored, and the historical vehicle trajectory data 235 becomes a series of two-dimensional (2D) coordinate pairs, each of which has an associated time stamp. The position data (e.g., latitude and longitude), in some embodiments, is produced using a combination of GPS and other localization sensors (e.g., dead-reckoning sensors) and techniques because GPS alone is sometimes insufficiently accurate.

Input module 215 also includes instructions that, when executed by the one or more processors 205, cause the one or more processors 205 to generate, from the historical vehicle trajectory data 235, a heatmap 240 indicating, for a given pixel in the heatmap 240, the extent to which the given pixel coincides spatially with one or more vehicle trajectories in the historical vehicle trajectory data 235. The heatmap 240 is thus a normalized image representation of the extent to which a particular pixel corresponding to a particular location on the roadway coincides with one or more of the historical vehicle trajectories in the historical vehicle trajectory data 235. As discussed above, this representation can be conveyed through colors, in some embodiments. In other embodiments, varying intensities of the pixels in grayscale can be used to convey the spatial correlation.

Input module 215 also includes instructions that, when executed by the one or more processors 205, cause the one or more processors 205 to project the heatmap 240 onto the image data 230 to generate a composite image 245. That is, the heatmap 240 is superimposed on the image data 230 to create a composite image 245.

Training module 220 generally includes machine-readable instructions that, when executed by the one or more processors 205, cause the one or more processors 205 to train a neural network to detect roadway lane boundaries using the composite image 245 discussed above as input. The process of training the neural network to detect roadway lane boundaries involves generating a plurality of such composite images 245 (in some embodiments, hundreds or thousands) and inputting them to the neural network in an iterative fashion subject to suitable cost functions. Herein, the description focuses on one such composite image 245 for simplicity. As explained above, the projected heatmap 240 acts as weak supervision for the training process to enhance the performance of the resulting trained neural network.

The final output of lane-boundary detection training system 200 is a trained neural network. In some embodiments, the neural network is a transformer encoder coupled with one or more decoder heads. In other embodiments, the neural network is a convolutional neural network (CNN). An embodiment employing the former architecture is described in greater detail below in connection with FIG. 3. In some embodiments, the neural network is trained to semantically label the roadway lane boundaries it detects. For example, the trained neural network can label a particular lane boundary as being a "left" or "right" lane boundary of the lane in question. Such semantic labeling can involve identifying which keypoints in the composite image 245 belong to a given lane boundary, describing a polyline.

Figure 3:
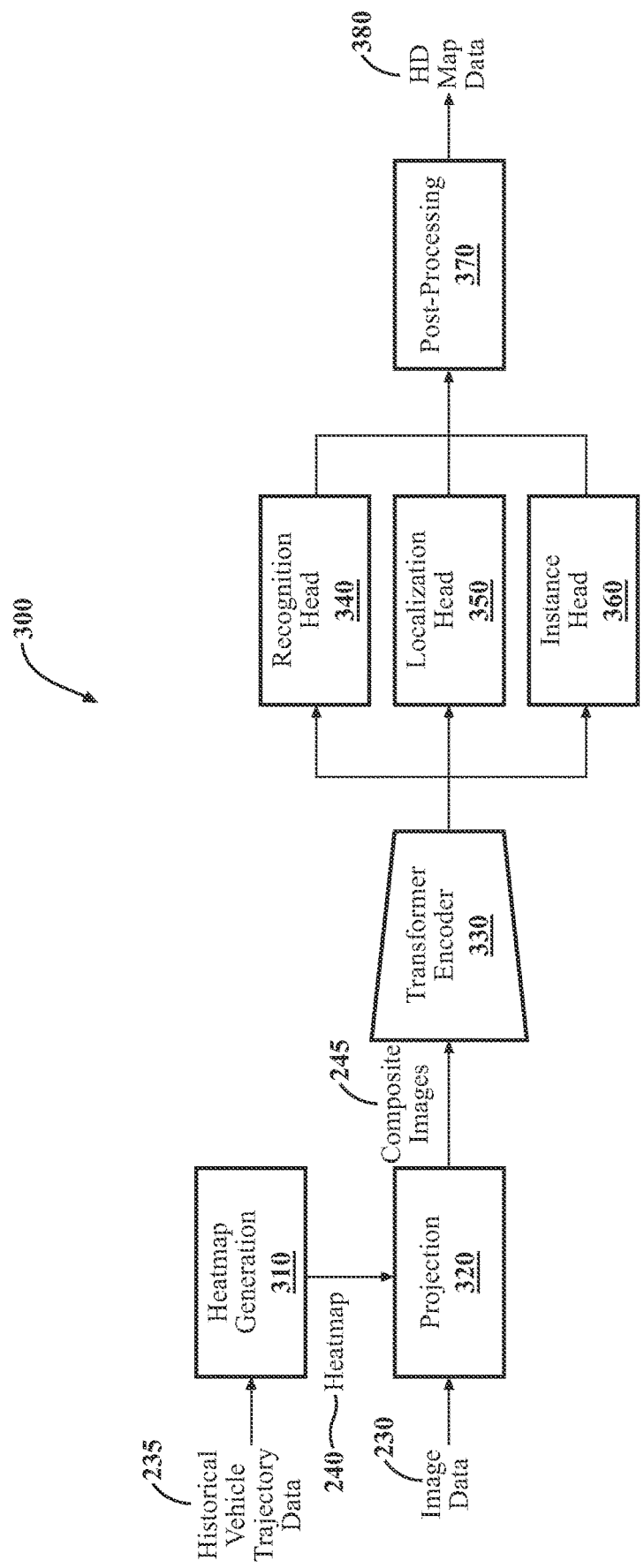
FIG. 3 illustrates a processing flow of a lane-boundary detection system, in accordance with an illustrative embodiment of the invention.

FIG. 3 illustrates a processing flow 300 of a lane-boundary detection system 170, in accordance with an illustrative embodiment of the invention. FIG. 3 depicts an inference-mode embodiment in which the training phase discussed above in connection with FIG. 2 has been completed and the resulting trained neural network is deployed in a semi-autonomous or autonomous vehicle 100. In such an embodiment, the trained neural network can be used to detect roadway lane boundaries in connection with (1) HD map generation for the benefit of other vehicles that download the HD map data or (2) tasks such as localization, motion planning, ADAS features (refer to ADAS 180 in FIG. 1), and/or navigation that benefit the vehicle 100 (the host vehicle or ego vehicle) itself. For illustration purposes only, FIG. 3 focuses on an embodiment in which a lane-boundary detection system 170 deployed in a vehicle 100 outputs HD map data 380 for the benefit of other vehicles that download the HD map data 380. As discussed above, once other vehicles have downloaded the HD map data 380, the HD map data 380 can support semi-autonomous or autonomous driving in those other vehicles. This means that, ultimately, the HD map data 380 including detected lane boundaries produced by a mapping vehicle 100 can be used to control, at least in part, the operation of the other semi-autonomous or autonomous vehicles to which the HD map data 380 is downloaded by virtue of the localization and decision making the HD map data 380 supports in those vehicles.

As indicated in FIG. 3, historical vehicle trajectory data 235 is input to an aspect of input module 215 (heatmap generation operation 310) that generates heatmaps 240 in the manner discussed above in connection with FIG. 2. A projection operation 320 projects each heatmap 240 onto image data 230 that corresponds to a particular portion/section of the roadway, producing a composite image 245. In the embodiment of FIG. 3, the composite images 245 are input to a transformer encoder 330. In other embodiments, a different neural-network architecture can be used (e.g., a CNN). Recognition head 340 attempts to assign a category to a given detected lane boundary (e.g., "left" or "right"). Localization head 350 attempts to identify the location of a given detected lane boundary in terms of spatial coordinates. Instance head 360 attempts to identify the instance of the lane boundaries (i.e., which keypoints belong to a given lane boundary to describe a polyline). In some embodiments, different colors are used to differentiate detected lane boundaries from one another. In other embodiments, solid vs. dashed lines can be used for that purpose. In the embodiment of FIG. 3, following any post-processing operations 370 that might apply, the output is HD map data 380, in which the detected lane boundaries have been semantically labeled.

In an embodiment in which lane-boundary detection system 170 is used to support semi-autonomous or autonomous driving tasks in an ego vehicle 100, the trained neural network is used to detect lane boundaries in real time. As discussed above, this enables the operation of the ego vehicle 100 to be controlled based, at least in part, on one or more roadway lane boundaries detected by the trained neural network. For example, autonomous driving module(s) 160 and/or ADAS 180 can use the detected lane boundaries provided by lane-boundary detection system 170, in conjunction with other sensor data and available information, to ensure that the ego vehicle 100 remains centered in its lane as it travels semi-autonomously or autonomously along the roadway.

Figure 4:
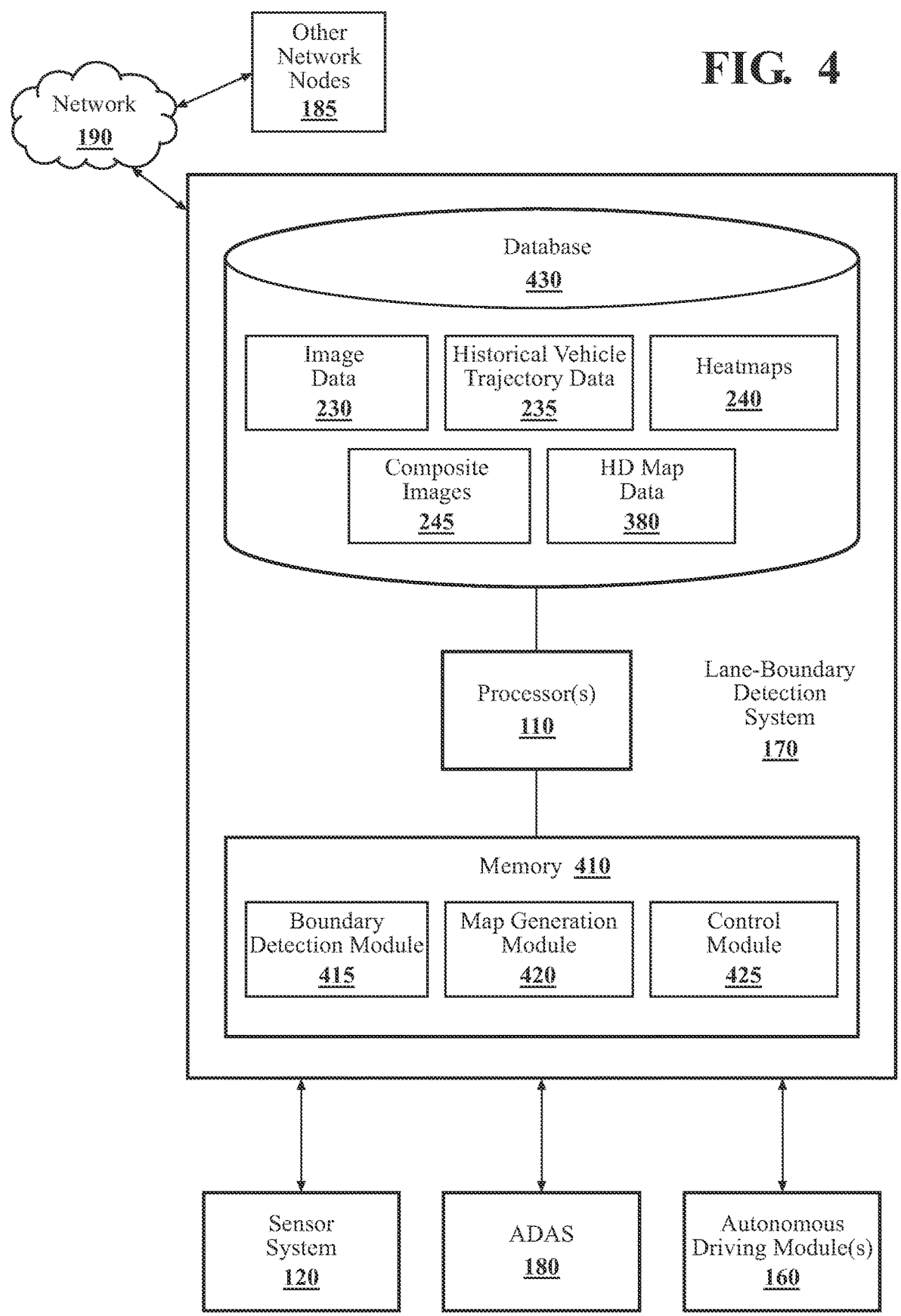
FIG. 4 is a block diagram of a lane-boundary detection system deployed in a vehicle, in accordance with an illustrative embodiment of the invention.

FIG. 4 is a block diagram of a lane-boundary detection system 170, in accordance with an illustrative embodiment of the invention. Like FIG. 3, FIG. 4 depicts an embodiment in which a lane-boundary detection system 170 is installed and deployed in a semi-autonomous or autonomous vehicle 100. In this embodiment, lane-boundary detection system 170 is shown as including one or more processors 110 from the vehicle 100 of FIG. 1. In general, the one or more processors 110 may be a part of lane-boundary detection system 170, lane-boundary detection system 170 may include one or more separate processors from the one or more processors 110 of the vehicle 100, or lane-boundary detection system 170 may access the one or more processors 110 through a data bus or another communication path, depending on the embodiment.

In this embodiment, memory 410 stores a boundary detection module 415, a map generation module 420, and a control module 425. The memory 410 is a random-access memory (RAM), read-only memory (ROM), a hard-disk drive, a flash memory, or other suitable memory for storing the modules 415, 420, and 425. The modules 415, 420, and 425 are, for example, computer-readable instructions that, when executed by the one or more processors 110, cause the one or more processors 110 to perform the various functions disclosed herein.

As shown in FIG. 4 and as discussed above, lane-boundary detection system 170 can communicate with one or more other network nodes 185 (e.g., other connected vehicles, cloud servers, edge servers, roadside units, infrastructure) via network 190. Lane-boundary detection system 170 can also interface and communicate with sensor system 120, ADAS 180, and autonomous driving module(s) 160.

Lane-boundary detection system 170 can store various kinds of data in a database 430. Examples include image data 230, historical vehicle trajectory data 235, heatmaps 240 generated from the historical vehicle trajectory data 235, and composite images 245 (heatmaps projected onto corresponding images in the image plane).

Boundary detection module 415 generally includes machine-readable instructions that, when executed by the one or more processors 110, cause the one or more processors 110 to detect one or more lane boundaries in the roadway environment of a vehicle 100 using the trained neural network discussed above in connection with FIG. 2 in accordance with the processing flow 300 discussed above in connection with FIG. 3. As explained above, the lane boundaries can be detected in connection with generating HD map data 380 for use by other vehicles to which the HD map data 380 is downloaded, or the lane boundaries can be detected in connection with controlling, at least in part, the operation of the vehicle 100 itself.

Map generation module 420 generally includes machine-readable instructions that, when executed by the one or more processors 110, cause the one or more processors 110 to generate and save map data (in some embodiments, HD map data 380) that includes detected roadway lane boundaries. As discussed above, in some embodiments the detected roadway lane boundaries are semantically labeled (e.g., as "left" or "right" lane boundaries). In generating the map data, map generation module 420 operates in conjunction with boundary detection module 415. As discussed above, the HD map data 380 can be downloaded to other vehicles besides vehicle 100 to support semi-autonomous or autonomous driving tasks in those other vehicles. This means that the HD map data 380 is ultimately used in connection with controlling, at least in part, the operation of the other vehicles to which the HD map data 380 is downloaded. That is, the HD map data 380 supports the autonomous driving system of a recipient vehicle in controlling one or more of acceleration, braking, and steering in connection with semi-autonomous or autonomous driving.

Control module 425 generally includes machine-readable instructions that, when executed by the one or more processors 110, cause the one or more processors 110 to control the operation of an ego vehicle 100 based, at least in part, on one or more roadway lane boundaries detected by the trained neural network (refer to boundary detection module 415 above). As explained above, in some embodiments controlling the operation of vehicle 100 can include controlling one or more of acceleration, braking, and steering. In controlling the operation of an ego vehicle 100, control module 425 can interface with autonomous driving module(s) 160 and/or ADAS 180, which, in turn, can manipulate one or more applicable vehicle systems 140 (refer to FIG. 1) to control the operation of vehicle 100.

Figure 5:
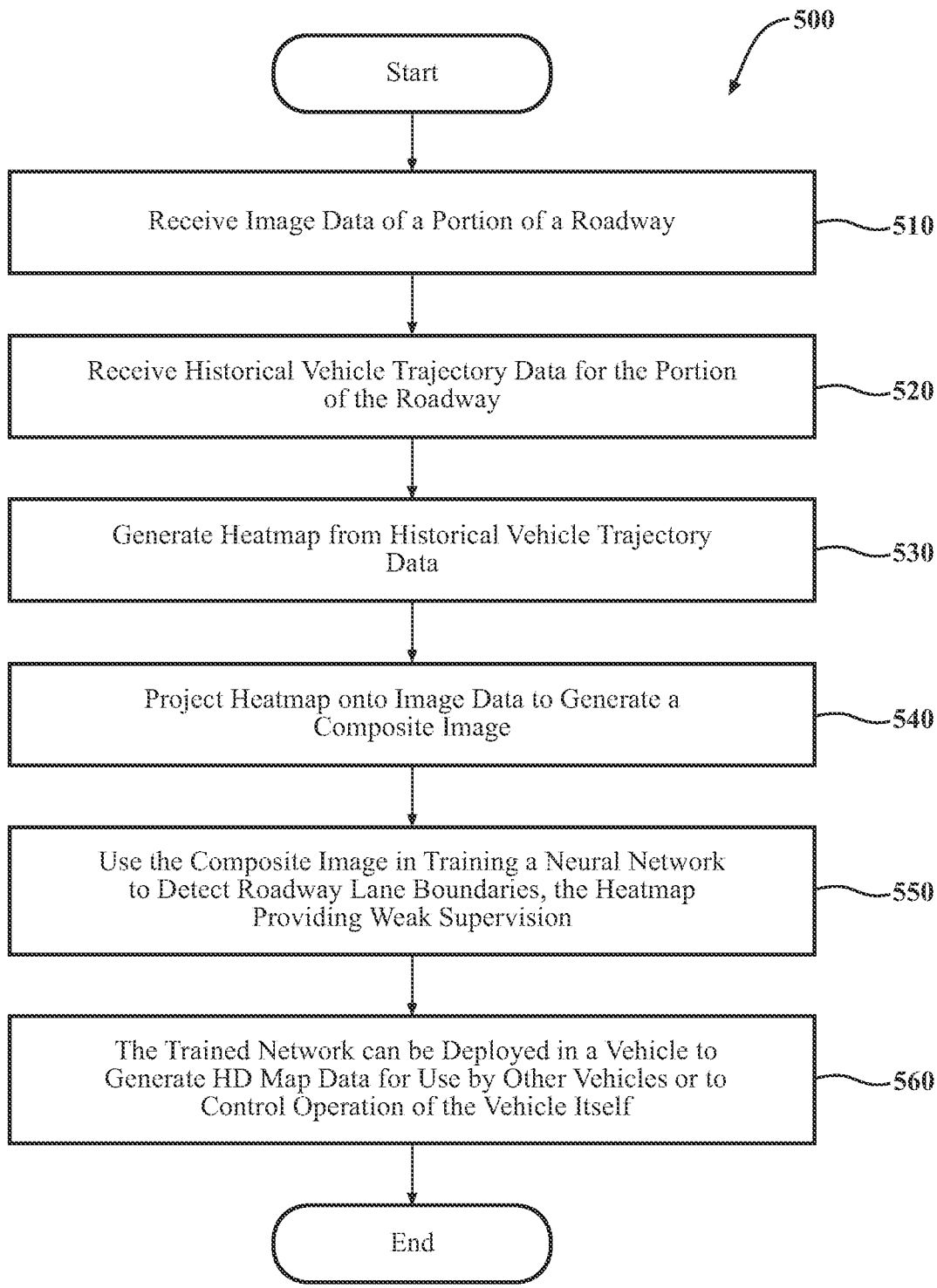
FIG. 5 is a flowchart of a method of detecting roadway lane boundaries, in accordance with an illustrative embodiment of the invention.

FIG. 5 is a flowchart of a method 500 of detecting roadway lane boundaries, in accordance with an illustrative embodiment of the invention. Method 500 will be discussed from the perspective of the lane-boundary detection training system 200 in FIG. 2. While method 500 is discussed in combination with lane-boundary detection training system 200, it should be appreciated that method 500 is not limited to being implemented within lane-boundary detection training system 200, but lane-boundary detection training system 200 is instead one example of a system that may implement method 500.

At block 510, input module 215 receives image data 230 of a portion of a roadway. As explained above, the received image data 230 depicts, in pictorial (image) form, the portion of the roadway in question. As also explained above, in some embodiments the image data 230 is collected from one or more vehicles in the field that gather images for use in training a neural-network-based lane-boundary detection system. In other embodiments, the image data 230 can be obtained from one or more public-domain or proprietary driving-related image databases.

At block 520, input module 215 receives historical vehicle trajectory data 235 for the same portion of the roadway just mentioned. As discussed above, the historical vehicle trajectory data 235 can be obtained from one or more vehicles in the field that store such data as they drive around from place to place. Some current commercially available vehicles include the capability to store such trajectory data and to upload it to, e.g., a server or workstation such as that in which lane-boundary detection training system 200 (refer to FIG. 2) is implemented. As those skilled in the art are aware, historical vehicle trajectory data 235 can include granular vehicle-location data (e.g., latitude, longitude, and altitude) as a function of time in discrete time steps (e.g., 1-second intervals, in one embodiment). In some embodiments, altitude is ignored, and the historical vehicle trajectory data 235 becomes a series of 2D coordinate pairs, each of which has an associated time stamp. The position data (e.g., latitude and longitude), in some embodiments, is produced using a combination of GPS and other localization sensors (e.g., dead-reckoning sensors) and techniques because GPS alone is sometimes insufficiently accurate.

At block 530, input module 215 generates, from the historical vehicle trajectory data 235, a heatmap 240 indicating, for a given pixel in the heatmap 240, the extent to which the given pixel coincides spatially with one or more vehicle trajectories in the historical vehicle trajectory data 235. As explained above, the heatmap 240 is a normalized image representation of the extent to which a particular pixel corresponding to a particular location on the roadway coincides with one or more of the historical vehicle trajectories in the historical vehicle trajectory data 235. As discussed above, this representation can be conveyed through colors, in some embodiments. In other embodiments, varying intensities of the pixels in grayscale can be used to convey the spatial correlation.

At block 540, input module 215 projects the heatmap 240 onto the image data 230 to generate a composite image 245. As explained above, the heatmap 240 is superimposed on the image data 230 to create the composite image 245.

At block 550, training module 220 trains a neural network to detect roadway lane boundaries using the composite image 245 discussed above as input. As explained above, the process of training the neural network to detect roadway lane boundaries ultimately involves generating a plurality of such composite images 245 (in some embodiments, hundreds or thousands) and inputting them to the neural network in an iterative fashion subject to one or more suitable cost functions. In other words, the action of training the neural network using a composite image 245 ends up being repeated a number of times to produce a fully trained network. As also explained above, the projected heatmap 240 acts as weak supervision for the training process to enhance the performance of the resulting trained neural network.

At block 560, the trained neural network produced by lane-boundary detection training system 200 can be deployed in a vehicle 100 to (1) generate and save map data (e.g., HD map data 380, in some embodiments) that includes detected roadway lane boundaries, the map data being used to control, at least in part, the operation of one or more other vehicles to which the map data is downloaded or (2) control the operation of the vehicle 100 itself based, at least in part, on one or more roadway lane boundaries detected by the trained neural network.

As explained above, in the inference or test phase in which the trained neural network is deployed in a vehicle 100 to detect lane boundaries, historical vehicle trajectory data 235 is represented as heatmaps 240 and projected onto corresponding image data 230 acquired from the vehicle's camera(s) 126, the resulting composite images 245 being input to the trained neural network. The heatmap data 240 is particularly helpful if HD map data 380 is unavailable or if weather conditions (e.g., heavy rain or snow) interfere with the ability of the trained model to detect the lane boundaries based on image data 230. In such a situation, lane-boundary detection system 170 can still estimate the location of the lane boundaries based on the historical vehicle trajectory data 235 represented as heatmaps 240.

FIG. 1 will now be discussed in full detail as an example vehicle environment within which the systems and methods disclosed herein may be implemented. In some instances, the vehicle 100 can be configured to switch selectively between an autonomous mode, one or more semi-autonomous operational modes, and/or a manual mode. Such switching, also referred to as handover when transitioning to a manual mode, can be implemented in a suitable manner, now known or later developed. "Manual mode" means that all of or a majority of the navigation and/or maneuvering of the vehicle is performed according to inputs received from a user (e.g., human driver/operator).

In one or more implementations, the vehicle 100 can be an autonomous vehicle. As used herein, "autonomous vehicle" refers to a vehicle that operates in an autonomous mode. "Autonomous mode" refers to navigating and/or maneuvering a vehicle along a travel route using one or more computing devices to control the vehicle with minimal or no input from a human driver/operator. In one implementation, the vehicle 100 is configured with one or more semi-autonomous operational modes in which one or more computing devices perform a portion of the navigation and/or maneuvering of the vehicle along a travel route, and a vehicle operator (i.e., driver) provides inputs to the vehicle to perform a portion of the navigation and/or maneuvering of the vehicle 100 along a travel route. Thus, in one or more implementations, the vehicle 100 operates autonomously according to a particular defined level of autonomy.

The vehicle 100 can include one or more processors 110. In one or more arrangements, the one or more processors 110 can be a main processor of the vehicle 100. For instance, the one or more processors 110 can be an electronic control unit (ECU). The vehicle 100 can include one or more data stores 115 for storing one or more types of data. The data store(s) 115 can include volatile and/or non-volatile memory. Examples of suitable data stores 115 include RAM, flash memory, ROM, PROM (Programmable Read-Only Memory), EPROM, EEPROM (Electrically Erasable Programmable Read-Only Memory), registers, magnetic disks, optical disks, hard drives, or any other suitable storage medium, or any combination thereof. The data store(s) 115 can be a component(s) of the one or more processors 110, or the data store(s) 115 can be operatively connected to the one or more processors 110 for use thereby. The term "operatively connected," as used throughout this description, can include direct or indirect connections, including connections without direct physical contact.

In one or more arrangements, the one or more data stores 115 can include map data 116. The map data 116 can include maps of one or more geographic areas. In some instances, the map data 116 can include information or data on roads, traffic control devices, road markings, structures, features, and/or landmarks in the one or more geographic areas. In one or more arrangement, the map data 116 can include one or more terrain maps 117. The terrain map(s) 117 can include information about the ground, terrain, roads, surfaces, and/or other features of one or more geographic areas. In one or more arrangement, the map data 116 can include one or more static obstacle maps 118. The static obstacle map(s) 118 can include information about one or more static obstacles located within one or more geographic areas.

The one or more data stores 115 can include sensor data 119. In this context, "sensor data" means any information about the sensors that a vehicle is equipped with, including the capabilities and other information about such sensors. As will be explained below, the vehicle 100 can include the sensor system 120. The sensor data 119 can relate to one or more sensors of the sensor system 120. As an example, in one or more arrangements, the sensor data 119 can include information on one or more LIDAR sensors 124 of the sensor system 120. As discussed above, in some embodiments, vehicle 100 can receive sensor data from other connected vehicles, from devices associated with ORUs, or both.

As noted above, the vehicle 100 can include the sensor system 120. The sensor system 120 can include one or more sensors. "Sensor" means any device, component and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors can function independently from each other. Alternatively, two or more of the sensors can work in combination with each other. In such a case, the two or more sensors can form a sensor network. The sensor system 120 and/or the one or more sensors can be operatively connected to the one or more processors 110, the data store(s) 115, and/or another element of the vehicle 100 (including any of the elements shown in FIG. 1).

The sensor system 120 can include any suitable type of sensor. Various examples of different types of sensors will be described herein. However, it will be understood that the implementations are not limited to the particular sensors described. The sensor system 120 can include one or more vehicle sensors 121. The vehicle sensors 121 can detect, determine, and/or sense information about the vehicle 100 itself, including the operational status of various vehicle components and systems.

In one or more arrangements, the vehicle sensors 121 can be configured to detect, and/or sense position and/or orientation changes of the vehicle 100, such as, for example, based on inertial acceleration. In one or more arrangements, the vehicle sensors 121 can include one or more accelerometers, one or more gyroscopes, an inertial measurement unit (IMU), a dead-reckoning system, a global navigation satellite system (GNSS), a global positioning system (GPS), a navigation system 147, and/or other suitable sensors. The vehicle sensors 121 can be configured to detect, and/or sense one or more characteristics of the vehicle 100. In one or more arrangements, the vehicle sensors 121 can include a speedometer to determine a current speed of the vehicle 100.

Alternatively, or in addition, the sensor system 120 can include one or more environment sensors 122 configured to acquire, and/or sense driving environment data. "Driving environment data" includes any data or information about the external environment in which a vehicle is located or one or more portions thereof. For example, the one or more environment sensors 122 can be configured to detect, quantify, and/or sense obstacles in at least a portion of the external environment of the vehicle 100 and/or information/data about such obstacles. The one or more environment sensors 122 can be configured to detect, measure, quantify, and/or sense other things in at least a portion the external environment of the vehicle 100, such as, for example, nearby vehicles, lane markers, signs, traffic lights, traffic signs, lane lines, crosswalks, curbs proximate the vehicle 100, off-road objects, etc.

Various examples of sensors of the sensor system 120 will be described herein. The example sensors may be part of the one or more environment sensors 122 and/or the one or more vehicle sensors 121. Moreover, the sensor system 120 can include operator sensors that function to track or otherwise monitor aspects related to the driver/operator of the vehicle 100. However, it will be understood that the implementations are not limited to the particular sensors described. As an example, in one or more arrangements, the sensor system 120 can include one or more radar sensors 123, one or more LIDAR sensors 124, one or more sonar sensors 125, and/or one or more cameras 126.

The vehicle 100 can further include a communication system 130. The communication system 130 can include one or more components configured to facilitate communication between the vehicle 100 and one or more communication sources. Communication sources, as used herein, refers to people or devices with which the vehicle 100 can communicate with, such as external networks, computing devices, operator or occupants of the vehicle 100, or others. As part of the communication system 130, the vehicle 100 can include an input system 131. An "input system" includes any device, component, system, element or arrangement or groups thereof that enable information/data to be entered into a machine. In one or more examples, the input system 131 can receive an input from a vehicle occupant (e.g., a driver or a passenger). The vehicle 100 can include an output system 132. An "output system" includes any device, component, or arrangement or groups thereof that enable information/data to be presented to the one or more communication sources (e.g., a person, a vehicle passenger, etc.). The communication system 130 can further include specific elements which are part of or can interact with the input system 131 or the output system 132, such as one or more display device(s) 133, and one or more audio device(s) 134 (e.g., speakers and microphones).

The vehicle 100 can include one or more vehicle systems 140. Various examples of the one or more vehicle systems 140 are shown in FIG. 1. However, the vehicle 100 can include more, fewer, or different vehicle systems. It should be appreciated that although particular vehicle systems are separately defined, each or any of the systems or portions thereof may be otherwise combined or segregated via hardware and/or software within the vehicle 100. The vehicle 100 can include a propulsion system 141, a braking system 142, a steering system 143, throttle system 144, a transmission system 145, a signaling system 146, and/or a navigation system 147. Each of these systems can include one or more devices, components, and/or combinations thereof, now known or later developed.

The one or more processors 110 and/or the autonomous driving module(s) 160 can be operatively connected to communicate with the various vehicle systems 140 and/or individual components thereof. For example, returning to FIG. 1, the one or more processors 110 and/or the autonomous driving module(s) 160 can be in communication to send and/or receive information from the various vehicle systems 140 to control the movement, speed, maneuvering, heading, direction, etc. of the vehicle 100. The one or more processors 110 and/or the autonomous driving module(s) 160 may control some or all of these vehicle systems 140 and, thus, may be partially or fully autonomous.

The vehicle 100 can include one or more modules, at least some of which are described herein. The modules can be implemented as computer-readable program code that, when executed by a processor 110, implement one or more of the various processes described herein. The processor 110 can be a device, such as a CPU, which is capable of receiving and executing one or more threads of instructions for the purpose of performing a task. One or more of the modules can be a component of the one or more processors 110, or one or more of the modules can be executed on and/or distributed among other processing systems to which the one or more processors 110 is operatively connected. The modules can include instructions (e.g., program logic) executable by one or more processors 110. Alternatively, or in addition, one or more data store 115 may contain such instructions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

In some implementations, the vehicle 100 can include one or more autonomous driving modules 160. The autonomous driving module(s) 160 can be configured to receive data from the sensor system 120 and/or any other type of system capable of capturing information relating to the vehicle 100 and/or the external environment of the vehicle 100. In one or more arrangements, the autonomous driving module(s) 160 can use such data to generate one or more driving scene models. The autonomous driving module(s) 160 can determine the position and velocity of the vehicle 100. The autonomous driving module(s) 160 can determine the location of obstacles, or other environmental features including traffic signs, trees, shrubs, neighboring vehicles, pedestrians, etc.

The autonomous driving module(s) 160 can be configured to determine travel path(s), current autonomous driving maneuvers for the vehicle 100, future autonomous driving maneuvers and/or modifications to current autonomous driving maneuvers based on data acquired by the sensor system 120, driving scene models, and/or data from any other suitable source. "Driving maneuver" means one or more actions that affect the movement of a vehicle. Examples of driving maneuvers include: accelerating, decelerating, braking, turning, moving in a lateral direction of the vehicle 100, changing travel lanes, merging into a travel lane, and/or reversing, just to name a few possibilities. The autonomous driving module(s) 160 can be configured can be configured to implement determined driving maneuvers. The autonomous driving module(s) 160 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The autonomous driving module (s) 160 can be configured to execute various vehicle functions and/or to transmit data to, receive data from, interact with, and/or control the vehicle 100 or one or more systems thereof (e.g., one or more of vehicle systems 140). The noted functions and methods will become more apparent with a further discussion of the figures.

Detailed implementations are disclosed herein. However, it is to be understood that the disclosed implementations are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various implementations are shown in FIGS. 1-5, but the implementations are not limited to the illustrated structure or application.

The flowcharts and block diagrams in the figures illustrate the architecture, functionality, and operation of possible implementations of systems, methods, and computer program products according to various implementations. In this regard, each block in the flowcharts or block diagrams can represent a module, segment, or portion of code, which comprises one or more executable instructions for implementing the specified logical function(s). It should also be noted that, in some alternative implementations, the functions noted in the block can occur out of the order noted in the figures. For example, two blocks shown in succession can be executed substantially concurrently, or the blocks can sometimes be executed in the reverse order, depending upon the functionality involved.

The systems, components and/or methods described above can be realized in hardware or a combination of hardware and software and can be realized in a centralized fashion in one processing system or in a distributed fashion where different elements are spread across several interconnected processing systems. Any kind of processing system or other apparatus adapted for carrying out the methods described herein is suited. A typical combination of hardware and software can be a processing system with computer-usable program code that, when being loaded and executed, controls the processing system such that it carries out the methods described herein. The systems, components and/or methods also can be embedded in a computer-readable storage, such as a computer program product or other data programs storage device, readable by a machine, tangibly embodying a program of instructions executable by the machine to perform methods and methods described herein. These elements also can be embedded in an application product which comprises all the features enabling the implementation of the methods described herein and, which when loaded in a processing system, is able to carry out these methods.

Furthermore, arrangements described herein can take the form of a computer program product embodied in one or more computer-readable media having computer-readable program code embodied or embedded, such as stored thereon. Any combination of one or more computer-readable media can be utilized. The computer-readable medium can be a computer-readable signal medium or a computer-readable storage medium. The phrase "computer-readable storage medium" means a non-transitory storage medium. A computer-readable storage medium can be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk drive (HDD), a solid state drive (SSD), a RAM, a ROM, an EPROM or Flash memory, an optical fiber, a portable compact disc read-only memory (CD-ROM), a digital versatile disc (DVD), an optical storage device, a magnetic storage device, or any suitable combination of the foregoing. In the context of this document, a computer-readable storage medium can be any tangible medium that can contain, or store a program for use by, or in connection with, an instruction execution system, apparatus, or device.

Program code embodied on a computer-readable medium can be transmitted using any appropriate medium, including but not limited to wireless, wireline, optical fiber, cable, RF, etc., or any suitable combination of the foregoing. Computer program code for carrying out operations for aspects of the present arrangements can be written in any combination of one or more programming languages, including an object-oriented programming language such as Java™ Smalltalk, C++ or the like and conventional procedural programming languages, such as the "C" programming language or similar programming languages. The program code can execute entirely on the user's computer, partly on the user's computer, as a stand-alone software package, partly on the user's computer and partly on a remote computer, or entirely on the remote computer or server. In the latter scenario, the remote computer can be connected to the user's computer through any type of network, including a LAN or a WAN, or the connection can be made to an external computer (for example, through the Internet using an Internet Service Provider).

In the description above, certain specific details are outlined in order to provide a thorough understanding of various implementations. However, one skilled in the art will understand that the invention may be practiced without these details. In other instances, well-known structures have not been shown or described in detail to avoid unnecessarily obscuring descriptions of the implementations. Unless the context requires otherwise, throughout the specification and claims which follow, the word "comprise" and variations thereof, such as, "comprises" and "comprising" are to be construed in an open, inclusive sense, that is, as "including, but not limited to." Further, headings provided herein are for convenience only and do not interpret the scope or meaning of the claimed invention.

Reference throughout this specification to "one or more implementations" or "an implementation" means that a particular feature, structure or characteristic described in connection with the implementation is included in at least one or more implementations. Thus, the appearances of the phrases "in one or more implementations" or "in an implementation" in various places throughout this specification are not necessarily all referring to the same implementation. Furthermore, the particular features, structures, or characteristics may be combined in any suitable manner in one or more implementations. Also, as used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

The headings (such as "Background" and "Summary") and sub-headings used herein are intended only for general organization of topics within the present disclosure and are not intended to limit the disclosure of the technology or any aspect thereof. The recitation of multiple implementations having stated features is not intended to exclude other implementations having additional features, or other implementations incorporating different combinations of the stated features. As used herein, the terms "comprise" and "include" and their variants are intended to be non-limiting, such that recitation of items in succession or a list is not to the exclusion of other like items that may also be useful in the devices and methods of this technology. Similarly, the terms "can" and "may" and their variants are intended to be non-limiting, such that recitation that an implementation can or may comprise certain elements or features does not exclude other implementations of the present technology that do not contain those elements or features.

The broad teachings of the present disclosure can be implemented in a variety of forms. Therefore, while this disclosure includes particular examples, the true scope of the disclosure should not be so limited since other modifications will become apparent to the skilled practitioner upon a study of the specification and the following claims. Reference herein to one aspect, or various aspects means that a particular feature, structure, or characteristic described in connection with an implementation or particular system is included in at least one or more implementations or aspect. The appearances of the phrase "in one aspect" (or variations thereof) are not necessarily referring to the same aspect or implementation. It should also be understood that the various method steps discussed herein do not have to be carried out in the same order as depicted, and not each method step is required in each aspect or implementation.

Generally, "module," as used herein, includes routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions. The term "module," as used herein, is not intended, under any circumstances, to invoke interpretation of the appended claims under 35 U.S.C. § 112(f).

The terms "a" and "an," as used herein, are defined as one as or more than one. The term "plurality," as used herein, is defined as two or more than two. The term "another," as used herein, is defined as at least a second or more. The terms "including" and/or "having," as used herein, are defined as including (i.e., open language). The phrase "at least one of . . . and . . . ." as used herein refers to and encompasses any and all possible combinations of one or more of the associated listed items. As an example, the phrase "at least one of A, B and C" includes A only, B only, C only, or any combination thereof (e.g., AB, AC, BC or ABC).

The preceding description of the implementations has been provided for purposes of illustration and description. It is not intended to be exhaustive or to limit the disclosure. Individual elements or features of a particular implementation are generally not limited to that particular implementation, but, where applicable, are interchangeable and can be used in a selected implementation, even if not specifically shown or described. The same may also be varied in many ways. Such variations should not be regarded as a departure from the disclosure, and all such modifications are intended to be included within the scope of the disclosure.

While the preceding is directed to implementations of the disclosed devices, systems, and methods, other and further implementations of the disclosed devices, systems, and methods can be devised without departing from the basic scope thereof. The scope thereof is determined by the claims that follow.

What is claimed is:

1. A system, comprising:
   a processor; and
   a memory storing machine-readable instructions that, when executed by the processor, cause the processor to:
   receive image data of a portion of a roadway;
   receive historical vehicle trajectory data for the portion of the roadway;
   generate, from the historical vehicle trajectory data, a heatmap indicating, for a given pixel in the heatmap, an extent to which the given pixel coincides spatially with one or more vehicle trajectories in the historical vehicle trajectory data; and
   project the heatmap onto the image data to generate a composite image and use the composite image in training a neural network to detect roadway lane boundaries, wherein the projected heatmap acts as supervisory data;
   wherein the trained neural network is deployed in a vehicle to perform one of generating map data used to control, at least in part, operation of another vehicle to which the map data is downloaded and controlling operation of the vehicle based, at least in part, on roadway lane boundaries detected by the trained neural network.

2. The system of claim 1, wherein the heatmap uses color to indicate the extent to which the given pixel coincides spatially with the one or more vehicle trajectories in the historical vehicle trajectory data.

3. The system of claim 1, wherein the trained neural network receives, as input, one or more composite images including historical-vehicle-trajectory-data heatmaps projected onto corresponding images.

4. The system of claim 1, wherein the map data is high-definition (HD) map data.

5. The system of claim 4, wherein detected roadway lane boundaries included in the HD map data are semantically labeled.

6. The system of claim 1, wherein the neural network is one of (a) a convolutional neural network and (b) a transformer encoder and one or more decoder heads.

7. The system of claim 1, wherein the roadway lane boundaries are painted on the roadway.

8. The system of claim 1, wherein the vehicle is one of a semi-autonomous vehicle and an autonomous vehicle.

9. The system of claim 1, wherein the controlling the operation of the vehicle based, at least in part, on roadway lane boundaries detected by the trained neural network includes controlling at least one of acceleration, braking, and steering.

10. A non-transitory computer-readable medium storing instructions that, when executed by a processor, cause the processor to:
    receive image data of a portion of a roadway;
    receive historical vehicle trajectory data for the portion of the roadway;
    generate, from the historical vehicle trajectory data, a heatmap indicating, for a given pixel in the heatmap, an extent to which the given pixel coincides spatially with one or more vehicle trajectories in the historical vehicle trajectory data; and project the heatmap onto the image data to generate a composite image and use the composite image in training a neural network to detect roadway lane boundaries, wherein the projected heatmap acts as supervisory data;

wherein the trained neural network is deployed in a vehicle to perform one of generating map data used to control, at least in part, operation of another vehicle to which the map data is downloaded and controlling operation of the vehicle based, at least in part, on roadway lane boundaries detected by the trained neural network.

11. The non-transitory computer-readable medium of claim 10, wherein the trained neural network receives, as input, one or more composite images including historical-vehicle-trajectory-data heatmaps projected onto corresponding images.

12. The non-transitory computer-readable medium of claim 10, wherein the neural network is one of (a) a convolutional neural network and (b) a transformer encoder and one or more decoder heads.

13. The non-transitory computer-readable medium of claim 10, wherein the vehicle is one of a semi-autonomous vehicle and an autonomous vehicle.

14. The non-transitory computer-readable medium of claim 10, wherein the heatmap uses color to indicate the extent to which the given pixel coincides spatially with the one or more vehicle trajectories in the historical vehicle trajectory data.

15. A method, comprising:
receiving image data of a portion of a roadway;
receiving historical vehicle trajectory data for the portion of the roadway;
generating, from the historical vehicle trajectory data, a heatmap indicating, for a given pixel in the heatmap, an extent to which the given pixel coincides spatially with one or more vehicle trajectories in the historical vehicle trajectory data; and projecting the heatmap onto the image data to generate a composite image and using the composite image in training a neural network to detect roadway lane boundaries, wherein the projected heatmap acts as supervisory data;

wherein the trained neural network is deployed in a vehicle to perform one of generating map data used to control, at least in part, operation of another vehicle to which the map data is downloaded and controlling operation of the vehicle based, at least in part, on roadway lane boundaries detected by the trained neural network.

16. The method of claim 15, wherein the heatmap uses color to indicate the extent to which the given pixel coincides spatially with the one or more vehicle trajectories in the historical vehicle trajectory data.

17. The method of claim 15, wherein the trained neural network receives, as input, one or more composite images including historical-vehicle-trajectory-data heatmaps projected onto corresponding images.

18. The method of claim 15, wherein the neural network is one of (a) a convolutional neural network and (b) a transformer encoder and one or more decoder heads.

19. The method of claim 15, wherein the vehicle is one of a semi-autonomous vehicle and an autonomous vehicle.

20. The method of claim 15, wherein the controlling the operation of the vehicle based, at least in part, on roadway lane boundaries detected by the trained neural network includes controlling at least one of acceleration, braking, and steering.

* * * * *